Jan. 14, 1947.　　　C. E. EVANS　　　2,414,291
NAVIGATION AND AERONAUTICAL INSTRUMENT
Filed May 9, 1942　　3 Sheets-Sheet 1
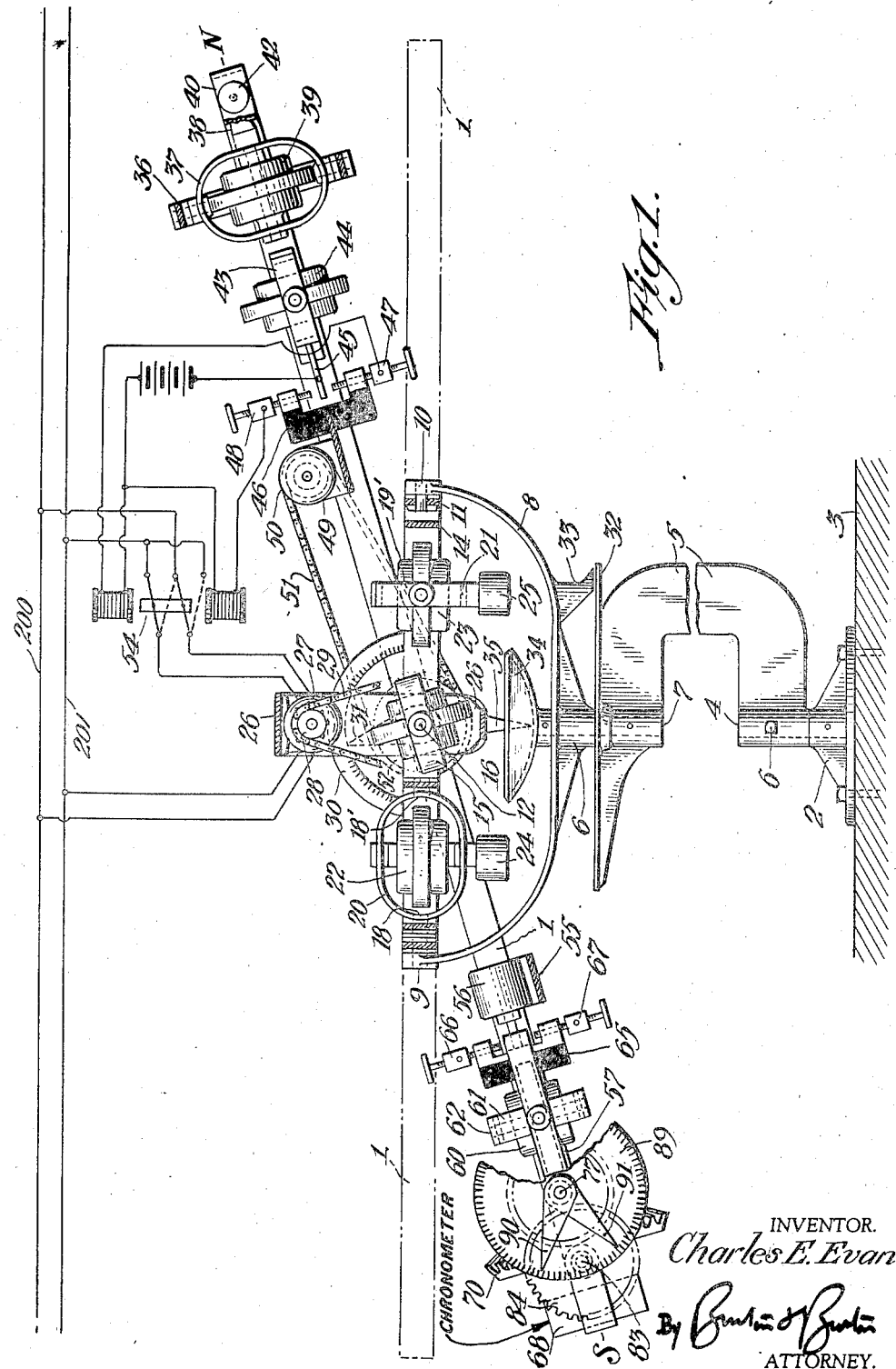
INVENTOR.
Charles E. Evans.
By [signature]
ATTORNEY.

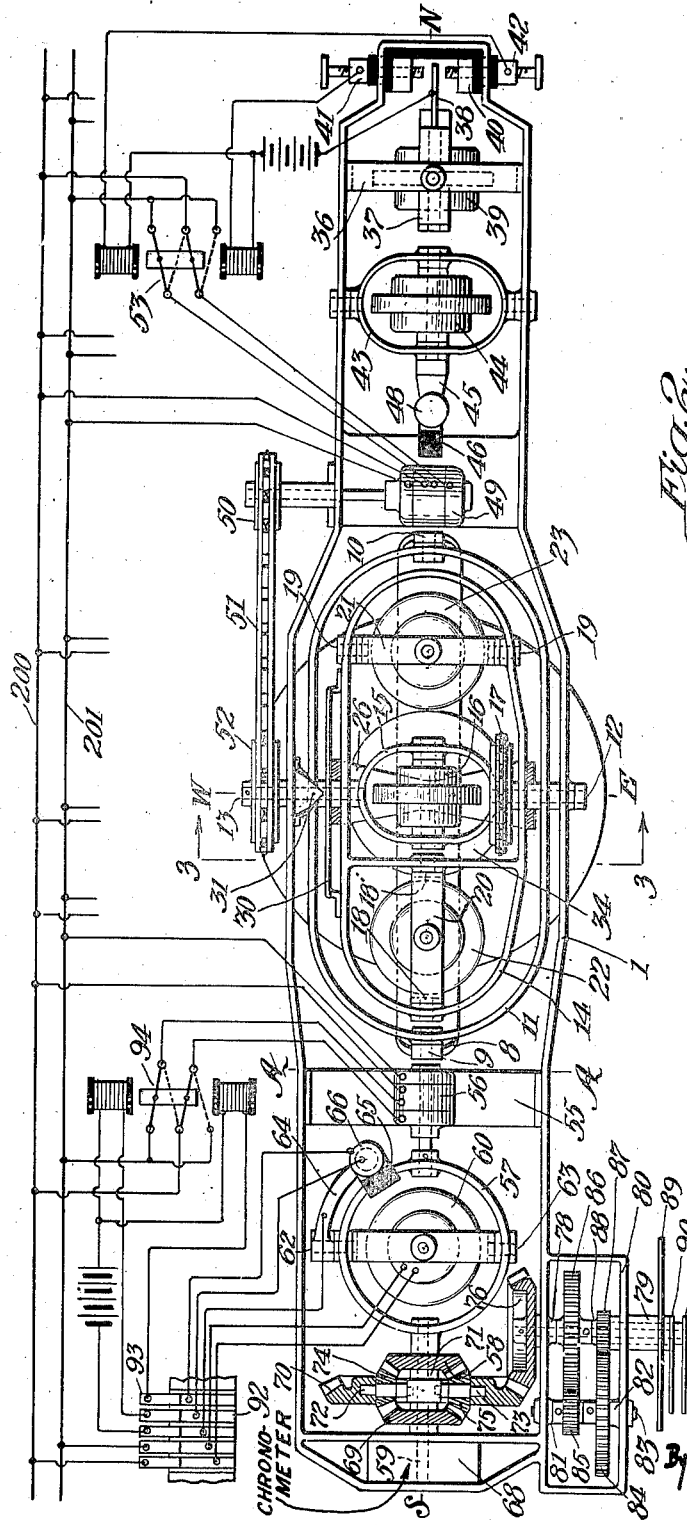

Jan. 14, 1947.　　　　C. E. EVANS　　　　2,414,291
NAVIGATION AND AERONAUTICAL INSTRUMENT
Filed May 9, 1942　　　3 Sheets-Sheet 3
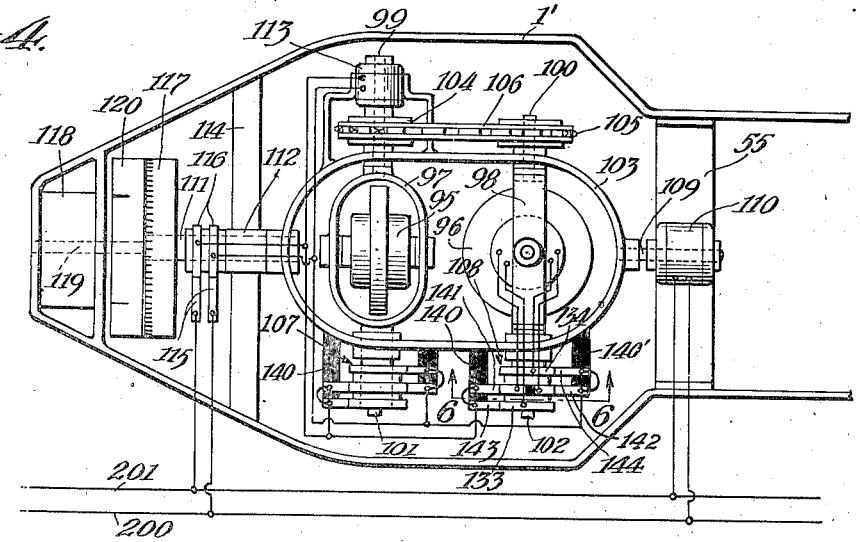
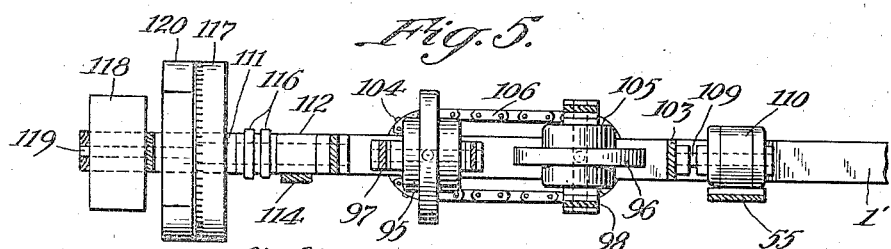
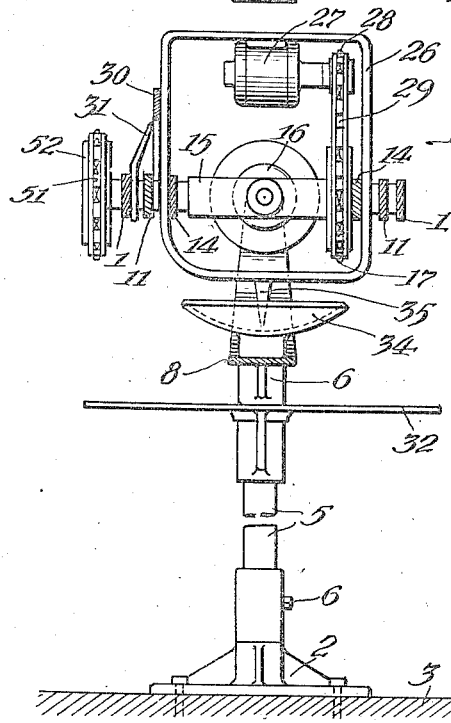
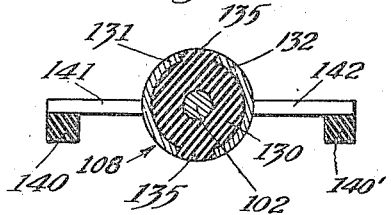
INVENTOR.
Charles E. Evans.
By
ATTORNEY.

Patented Jan. 14, 1947

2,414,291

UNITED STATES PATENT OFFICE 2,414,291

NAVIGATION AND AERONAUTICAL INSTRUMENT

Charles E. Evans, Aurora, Ill.

Application May 9, 1942, Serial No. 442,319

12 Claims. (Cl. 33—204)

This invention is concerned with improvements in instruments, devices and methods for the indication of latitude or longitude, or the points of the compass, or the position or bearing, or inclination of a ship or aeroplane, and for related purposes.

One object of the invention is to provide a new and improved gyroscopically controlled instrument for use in the navigation of ships and aeroplanes.

Another object is to provide a combination of devices forming an instrument capable of indicating the latitude and the longitude of any point at which the device may be located.

A further object is to provide an instrument which may be mounted on a ship and which will indicate the latitude, or longitude, or inclination of the ship, or the directions of the compass, without recourse to solar or astronomical observations, except periodically for calibrating purposes.

The invention is based largely on the well known properties of the gyroscope, namely, its tendency to maintain its position relative to space, and its tendency to precess under certain conditions.

The advantages of the invention are that the latitude or longitude, direction of travel, as in the case of a ship at sea, or in the air, can be determined at practically any time of day or night in practically any weather, more easily and accurately than with devices now in use, and without recourse to involved calculation, or to assumptions, or to land communication, or to astronomical or solar observations. Also, in the instruments herein shown and described, a change in latitude will not affect the north reading nor the longitude readings, neither will a change in longitude affect the north reading or the latitude reading. These instruments may be used on land or sea, or in the air.

This application is a continuation-in-part of my application Serial No. 283,708, filed July 10, 1939, and has been substituted therefor. It should be understood that the drawings which form a part of this application are largely diagrammatic and do not necessarily show all the structure in strictly correct proportions.

In the drawings:

Figure 1 is a side elevation of an instrument embodying this invention, with some parts broken away or shown in section, and including a schematic wiring diagram for certain of the units.

Figure 2 is a plan view, showing the frame in horizontal position, with certain parts in section, and also including a wiring diagram for certain units.

Figure 3 is a vertical sectional view taken substantially as indicated at line 3—3 on Figure 2.

Figure 4 is a plan view of a modified construction adapted to be substituted for that part of the instrument which lies to the left of line A—A on Figure 2, and including a wiring diagram.

Figure 5 is a side elevation, partly in section, of the structure shown in Figure 4.

Figure 6 is a detail section taken as indicated at line 6—6 on Figure 4.

While there is shown and described herein certain specific structure embodying the invention, it will be manifest to those skilled in the art that various modifications and re-arrangements of the parts may be made without departing from the spirit and scope of the invention, and that the same is not limited to the particular forms herein shown and described, except in so far as indicated by the appended claims.

As shown in the drawings, the main frame 1 is provided with a base 2, rigidly attached to the deck or floor 3 or similar part of the ship or aeroplane on which the instrument is installed. The base 2 supports a post 4 on which a bracket 5 is pivotally carried, and a set screw 6 is provided in the bracket 5 for securing the latter against rotation on the post 4. The upper end of the bracket 5 carries a fixed spindle 7 on which a yoke 8 is pivotally mounted. Pivot pins 9 and 10 connect a yoke 11 to the yoke 8; and a pair of aligned shafts 12 and 13 projecting rigidly from a frame 14 within the yoke 11, extend pivotally through the yoke 11 at its opposite sides and serve as supporting pivots for the frame 1. At their inner ends the shafts 12 and 13 pivotally support a yoke 15 which carries a motor-gyro unit 16 with its spin axis at right angles to that of said shafts; and a sprocket wheel 17 is rigidly attached to said yoke 15. By means of pivot pins 18 and 18' disposed longitudinally in the frame 14, this frame supports a yoke 20, and upon transversely disposed pivots 19 and 19' it supports a yoke 21. These yokes 20 and 21 carry fixedly the shafts on which revolve the motor-gyro units 22 and 23, respectively, which are provided with counterweights 24 and 25 whereby each of these motor-gyro units has a center of gravity below the axis of its supporting pivots, 18 and 18' or 19 and 19', so that the spin axis of the unit tends to remain vertical. The motor-gyro units 22 and 23 are of the type having field coils built into the gyro wheels, while the armature coils are mounted on their respective shafts, said shafts being secured rigidly to the yokes 20 and 21. In fact, all motor-gyro units shown in the drawings may be of this type, although gyroscopic wheels of almost any type, arranged to revolve continuously about their axes, would serve the purpose. A cross frame 26, rigid with the frame 14, supports a reversible motor 27, having a driving sprocket wheel 28 connected by a drive chain 29 to the sprocket 17.

An arcuate segment 30, graduated in degrees and fractions thereof in terms of latitude of position, is secured rigidly to the frame 14, in concentric relation to the axis of shafts 12 and 13, and a pointer 31, attached rigidly to the frame 1 extends in position to traverse the scale 30. The bracket 5 carries rigidly a dial 32 on which the points of the compass are marked, and a pointer 33 attached to the yoke 8, traverses this compass dial. The fixed spindle 7 supports fixedly a spherically concave dial 34 and a pointer 35 attached to the cross frame 26 swings over this dial 34.

In the right-hand portion of the frame 1, as viewed in Figures 1 and 2, there is rigidly secured a yoke 36 which pivotally supports the yoke 37 having a projecting spring contact arm 38 and carrying a motor-gyro unit 39. The frame 1 is fitted with an insulator block 40 which supports contact screws 41 and 42 in position for alternative engagement with the arm 38. In this portion of the frame 1 there is pivotally carried a yoke 43 with its motor-gyro unit 44 and projecting spring contact arm 45. An insulator block 46 on the frame 1 supports contact screws 47 and 48 in position for alternative engagement by the arm 45. Also mounted on the frame 1 is a reversible motor 49 to the shaft of which is rigidly secured a sprocket 50 connected by a drive chain 51 to a sprocket wheel 52, rigidly carried on the shaft 13.

The spring arm 38 and contact screws 41 and 42 are electrically connected to a snap-action reversing switch 53 as shown by the wiring diagram in Figure 2, so that engagement of the arm 38 with the screw 41 or the screw 42 determines the direction of rotation of the motor 49. The spring arm 45 and its co-operating contact screws 47 and 48 are electrically connected to a snap-action reversing switch 54 for controlling the direction of rotation of the motor 27 as indicated by the wiring diagram in Figure 1.

At the left-hand portion of the instrument, as shown in Figures 1 and 2, the frame 1 includes a hanger bar 55 on which there is mounted a reversible motor 56 to the shaft of which is rigidly attached a yoke 57. At the opposite side the yoke 57 is rigidly secured to the hub of a bevel gear 58 journaled on a shaft 59 which is axially aligned with the shaft of motor 56. A motor-gyro unit 60 is carried in a yoke 61 in which are fixed the pivot pins 62 and 63 extending pivotally into the yoke 57. A curved contact arm 64 is rigidly secured to the pivot pin 62 and extends between spaced contact screws 66 and 67 mounted on an insulator block 65 carried by yoke 57.

The shaft 59 extends from a chronometer or clock-like mechanism 68, carried at the end of the frame 1, and operating to revolve said shaft once for each revolution of the earth about its own axis; and a bevel gear 69 is rigidly secured to the shaft 59. A larger bevel gear 70, having a hub 71, is journaled on the shaft 59 and carries axle pins 72 and 73 which rotatably support bevel pinions 74 and 75 meshing with gears 58 and 69 to form a differential drive train. A bevel gear 76, meshing with the gear 70 is fixed on its shaft 77, which is journaled in a bearing 78 at one side of the fame 1 and also extends through a bearing 79 carried by a bracket 80 secured to the frame 1. The frame and said bracket 80 also provide bearings 81 and 82 in which there is journaled a shaft 83 which carries fixed to it a gear 84 and a pinion 85. A gear 86 is secured on shaft 77, and a pinion 87 is secured to a sleeve 88 which turns loosely on said shaft 77. The pinion 85 meshing with gear 86 and the gear 84 meshing with pinion 87 thus form a drive train for turning the sleeve 88. A dial 89 is fixed on the bearing 79; and a hand or pointer 90, carried by the sleeve 88, and another hand or pointer 91 attached to the shaft 77 traverse the dial 89.

At the left-hand end of Figure 2 there are shown in the wiring diagram a number of collector rings 92 which may be mounted on the hub of the gear 58, or which might be carried on the adjacent face of said gear 58, if preferred, said rings being properly insulated from each other and from the gear and being connected by suitable conductors with the contact arm 64, contact screws 66 and 67, and with the motor-gyro unit 60. Brushes 93, lead from said collector rings to the snap-action reversing switch 94 and to a source of electric current supply for the motor-gyro unit 60, as indicated in the diagram.

*Operation of instrument as shown in Figures 1, 2 and 3*

In operation, the several motor-gyro units are energized from the feed wires 200, 201, to revolve at a proper speed, and with the instrument in normal position, the longitudinal axis or line of centers, denoted by S-N on Figures 1 and 2, lies in a north-south position as viewed in plan, and in elevation this axis is parallel to the earth's axis of rotation. Obviously, the instrument could be maintained in a north-south position by means of some form of commercial gyro compass, in which case the motor 27 and the gyro unit 16, together with the chain and sprockets connecting the same, could be dispensed with, as could also the gyro unit 44, together with its accessory parts. At any position on the earth's surface, except at the equator, if the supporting deck 3 is substantially level, the instrument will extend at an angle to the surface 3, and in Figure 1, it is assumed to be located in latitude about 17 degrees north; the line of centers E-W as denoted on Figure 2, lies in an east and west position, and horizontal. In general the instrument functions as follows:

The frame 14 is stabilized horizontally about an east and west axis by the gyroscopic inertia of the motor-gyro unit 22 and horizontally about a north and south axis by the gyroscopic inertia of the motor gyro-unit 23. These units together, tend to hold the frame 14 in a level position when the deck 3 on which the instrument is mounted, pitches or rolls; and the supports, including pivotal connections at 9 and 10, and at 12 and 13, are such as to allow within the required limits, a universal motion of the deck with respect to the frame 14. The C-shaped bracket 5 and the pivot post 4 are provided for use in extreme latitudes. The counter-weights 24 and 25 further stabilize the frame 14. The counterweights also tend to bring the units 22 and 23 back to normal after any disturbing impulse has passed, and act as plumb bobs to level up the frame 14. As previously stated the shafts 12 and 13 project rigidly from the frame 14 and serve as supporting pivots for the frame 1. The frame 1 is held extending in a north-and-south direction in a manner which will be described presently. Therefore, when the craft on which the instrument is mounted changes its course, the craft and the base 2 will turn about the axis of the spindle 7, but the frame 14 being held in vertical alignment with the frame 1 by the connecting pivots 12 and 13 will not turn in azimuth with the craft. This frame forms a stabilized base to support the rest of the instrument. The amount of pitch or roll of a ship at sea can be read by means of the dial 34 and pointer 35, or the inclination of an air ship, in either direction, can be read by the same means.

In the aforesaid normal position a line passed through the pivots of either of the yokes 15, 37 or 43, which support the motor-gyro units 16, 39 and 44, respectively, will, in each case, be in a plane normal to the earth's axis of rotation. The motors 27, 49 and 56 will be constantly energized and constantly reversing, as hereinafter explained, although with practically no real motion.

The motor 56, being constantly energized, will have a tendency to rock the yoke 57, one way or the other about the axis of the shaft of said motor, thereby putting pressure on the pivots 62 and 63 of the yoke 61. However, this tendency will be resisted by the gyroscopic inertia of the motor-gyro unit 60, which will oppose any movement of the yoke 57 relative to space, and will precess, causing the arm 64 to contact one of the contact screws 66 or 67 thereby forming an electrical circuit connection which will actuate the switch 94 and thereby reverse the motor 56. This will reverse the action just described and cause the motor-gyro unit 60 to precess in the opposite direction, thereby again actuating the switch 94 and reversing the motor 56, and so on, ad infinitum. This operates to maintain the yoke 57 parallel to its original position relative to space, with no real motion, but with an apparent motion of one revolution for each revolution of the earth, but in the opposite direction.

Now the motor 27, acting through the drive chain 29 and sprocket wheels 28 and 17, will have a tendency to rock the motor-gyro unit 16 and its yoke 15 one way or the other, and this tendency will create a tendency for the motor-gyro unit 16 to precess and thereby swing the frame 1 sideways—that is about the axis of the spindle 7. However, this tendency to swing the frame 1 sideways about the axis of the spindle 7, will put pressure on the pivots of the yoke 43. However this pressure will be resisted by the gyroscopic inertia of the motor-gyro unit 44, which will oppose any sideways swinging movement of the frame 1 about the spindle 7, and which will precess and cause the arm 45 to contact one of the screws 47 or 48, thereby closing a circuit which will actuate the switch 54 and thereby reverse the motor 27. This will reverse the action just described and cause the motor-gyro unit 44 to precess in the opposite direction and again actuate the switch 54, reversing the motor 27, and so on ad infinitum. This operates to maintain the frame 1 in its original north-and-south position.

At the same time, the motor 49, acting through the drive chain 51 and the sprocket wheels 50 and 52, will have a tendency to rock the frame 1 up or down, because the sprocket wheel 52 is rigidly secured to the shaft 13 while said shaft is fixedly engaged with the stabilized frame 14. But this tendency of the motor 49 to rock the frame 1 up or down will cause pressure to be transmitted through the fixed yoke 36 to the pivots of the yoke 37. However, this pressure will be resisted by the gyroscopic inertia of the motor-gyro unit 39, which will oppose any up or down rocking movement of the frame 1, and which will precess, thus causing the arm 38 to contact one of the screws 41 or 42, thereby closing a circuit which will actuate the switch 53 to reverse the motor 49. This will cause the motor-gyro unit 39 to precess in the opposite direction and thereby again actuate the switch 53 and reverse the motor 49, and so on, ad infinitum. This operates to maintain the frame 1 in a position parallel to the earth's axis of rotation.

Changes in heading of the craft will be indicated by the pointer 33 in conjunction with the dial 32. Latitude will be shown by the pointer 31, traversing the graduated segment 30. As for longitude, it will be understood that the yoke 57, together with the gear 58, would have an apparent motion of one revolution for each revolution of the instrument about the earth's axis of rotation, relative to space, but in a counter-direction. Now the shaft 59 and its gear 69, as previously stated, are caused to revolve one revolution for each revolution of the earth and in the same direction. Thus, by reason of the coupling between the gears 58 and 69, which consists of the pinions 74 and 75, the gear 70, by which these pinions are carried, will have no apparent motion as long as the instrument remains in the same longitude. But, if the instrument is moved in either an easterly or a westerly direction, the relative rate of motion of the gears 58 and 69 will change, and the gear 70 will revolve ½ a revolution for each revolution of difference in the number of turns made by the gears 58 and 69. If the gear 76 which meshes with gear 70 has ½ as many teeth as the gear 70, then the shaft 77 and its hand 91 will make one revolution for each time the instrument is carried around the earth; hence, if the dial 89 be graduated in 360 equal divisions, the position of the hand 91 will indicate degrees of longitude. If the overall ratio of the gears 86, 85, 84, 87 be made 360 to 1, then the hand 90, driven by the gear 87 will traverse the dial once for each degree through which the hand 91 moves. Thus the dial may carry a series of sixty equal subdivisions representing minutes of longitude; and obviously, if desired, an additional hand, properly geared, may be supplied to furnish a reading in seconds. It may be understood that the gears 86, 85, 84, 87 are not shown to scale in the drawings, and that, if desired, this gear train may be variously modified to produce any required ratio.

*Modified construction shown in Figures 4 and 5*

The part of the instrument which lies to the left of the line A—A in Figure 2 may be replaced by the structure shown in Figures 4 and 5. For this purpose the adjacent portions of the frame 1 would be somewhat modified as shown at 1'.

In this arrangement, the motor-gyro units 95 and 96 are carried on the yokes 97 and 98, respectively; the yoke 97 is supported by shafts 99 and 101 secured rigidly to it at opposite sides and pivotally carried in a larger yoke 103. The yoke 98 is similarly provided with shafts 100 and 102 extending rigidly from it at opposite sides and pivotally carried also in the yoke 103. Secured to the shafts 99 and 100, respectively, are the sprocket wheels 104 and 105 which are connected together by a drive chain 106 so that the motor-gyro units 95 and 96 are maintained in positions with their spin axes disposed at substantially 90 degrees to each other, while both units may still turn about the pivotal mountings of their yokes 97 and 98 in the yoke 103. One end of the yoke 103 is secured to the shaft 109 of a motor 110 mounted on the hanger bar 55 which extends across the frame 1; and the other end of the yoke 103 is secured to a shaft 111, which is journaled in a bearing 112 supported on a cross bar 114.

Mounted on the shafts 101 and 102, respectively, are the commutator-like devices 107 and 108, which control the electric circuits that operate the motors of the gyro units 95 and 96. These devices, which comprise fixed brushes connected to suitable feed wires 200 and 201 and contacting conductor segments suitably insulated on the shafts 101 and 102 and wired to the motors of the gyro units, have their said conductor segments of such length and so related to the fixed brushes that when either of the motor-gyro units has precessed to a position at which its spin axis has come into alignment with the axis of the outer yoke 103, the spin direction of rotation of that unit is reversed automatically. For example, with the gyro unit 95 at such a position (as shown in Figures 4 and 5), the tendency of this unit to precess on account of torques applied about the N–S axis is a minimum, but the other unit, 96, with its spin axis maintained at 90 degrees to that of the unit 95 (by reason of the connecting chain 106), is in position for a maximum tendency to precess on account of such torques. The automatic reversal of the motor-gyro 95 by the operation of its commutator device 107 permits precession of the unit 96 to continue in the same direction and prepares the unit 95 to assume control as the spin axis of unit 96 approaches its position of alignment with the axis of the yoke 103. Thereupon the direction of spin of the motor-gyro 96 is automatically reversed by its commutator device 108 having segments and brushes dimensioned and arranged to accomplish this.

Meanwhile a continuous torque is applied to the yoke 103, always in the same direction by means of the motor 110 to which the yoke 103 is connected at one end. This torque is resisted by the precession of the motor-gyro units 95 and 96, supplementing each other as just explained, and preferably there is mounted in a suitable supporting bracket at one side of the yoke 103 an auxiliary motor 113, which is coupled to the shaft 99 to augment the effect of the precession of the motor gyros. The current supply is maintained through brushes 115 contacting with collector rings 116 from which suitably insulated conductors extend through the hollow shaft 111 to the yoke 103 along which they run to the motor 113 and to the commutator devices 107 and 108, as shown in Figure 4.

Secured to the shaft 111, is a drum type dial 117, graduated in degrees and subdivisions thereof. On the frame 1' is carried the clock or chronometer mechanism 118 having a shaft 119 which revolves in a direction counter to the earth's rotation once for each revolution of the earth about its axis. On this shaft there is rigidly secured a drum type dial 120 which is graduated in suitable divisions.

The commutator devices 107 and 108 are alike— hence a description of one will suffice. The shaft 102 carries a hub 130 of insulating material on which are secured metallic contact segments 131 and 132 as shown in Figure 6. Arms 140 and 140' of insulation support brushes 141 and 142 which contact respectively with said segments. These brushes are connected to opposite ends of the armature circuit of motor 96; the field circuit is supplied by brushes 143 and 144 which contact with collector rings 133 and 134 on the hub 130. Thus when precession of the yoke 98 turns the commutator for hub 130 far enough to bring segment 132 into contact with brush 141 and segment 131 into contact with brush 142 the polarity of the armature will change without any corresponding change in the field, and the motor 96 will reverse its direction of rotation. Preferably the ends of segments 131 and 132 are separated by substantial portions 135 of the insulating hub 130 so that when the brushes engage these parts 135 the motor 96 will stop, but the commutator hub 130 will continue to turn as the motor-gyro unit 95 continues to precess and turns the yoke 98 by means of the connecting chain 106.

*Operation of modified instrument, Figures 4 and 5*

When the structure shown at the left of line A—A in Figure 2 is replaced by that of Figures 4 and 5, then, with the instrument disposed in normal position (the center line S–N extending in a north-south direction, as viewed in plan, and extending parallel to the earth's axis, as viewed in elevation), the motor 110 is constantly energized so as to constantly apply torque to the yoke 103, which yoke is thereby caused to exert pressure on the pivot points of the yokes 97 and 98. However, this pressure is resisted by the gyroscopic inertia of either one or both of the motor-gyro units 95 and 96, which will oppose any movement of the yoke 103, and will precess continuously, with their spin motors automatically and alternately stopping and reversing, with one unit turning the other through the drive chain 106 and sprockets 104 and 105 which the chain connects. The above described action causes the yoke 103 to maintain its position relative to space and to turn, relative to the earth, slowly about its axis (the axis of motor 110 and shaft 111) to the extent of one revolution for each revolution of the earth about its own axis, if the instrument remains in a given longitude, or to a greater or lesser extent if the instrument is moved from one longitude to another. Now, if as previously set forth, the yoke 103 is secured to the shaft 111, and the drum type dial 117 is also secured to said shaft, then with the dial 120 positioned coaxially with the dial 117, and connected to shaft 119 of the chronometer mechanism 118, as already described, the relative positions of said dials 117 and 120 may be interpreted to indicate longitude.

If the motor 113 is included in the structure it will be constantly energized so as to facilitate the precession of the motor-gyro units 95 and 96, by overcoming the friction of various parts. The motor 110 is proportioned, however, to definitely dominate the motor 113, so that the desired rotation of the yoke 103 will not be defeated, but will be assured in so far as it is permitted by the opposing gyroscopic inertia of the motor-gyro units 95 and 96, one or the other of which is effective at all times because they are coupled together by the chain 106 with their spin axis at right angles to each other.

In Figures 1 and 2, the contact arms 38 and 45, which swing with the yokes 37 and 43 of the motor gyro units as the latter precess, are preferably spring arms adapted to flex as they engage with the contact screws at either limit of their range of swing. The precession of the gyroscope is thus yieldingly arrested and, incidentally, the flexure of the spring arm causes it to store energy absorbed from the momentum of the precessing parts, so that simultaneously with the reversal of the motor 27 or the motor 49, this stored energy is released by the spring contact arm and helps to start precession of the gyroscope in the opposite direction.

I claim as my invention:

1. In an instrument of the character described, a gyroscopic unit comprising a wheel, a yoke in which it is journaled, and a second yoke in which the first yoke is pivoted at an axis which intersects the spin axis of the wheel at right angles and at the center of gravity of the unit, a frame and pivotal means supporting the second yoke on said frame at an axis substantially at right angles to the first mentioned pivot axis and substantially parallel to the earth's axis of rotation, a motor on said frame, and means continuously transmitting torque from said motor to the second yoke about the axis of said last mentioned pivotal means to cause a definite loading of said yoke in excess of any torque required to overcome friction and any force required to actuate the instrument, including means continuously energizing said motor, a snap action switch instantly reversing the torque applied by said motor from full strength in one direction to full strength in the other direction, and control means for said switch actuated by the precession of the gyroscope and first yoke beyond a predetermined limit relative to the second yoke in either direction, such loading causing the gyroscope and yoke to precess continuously, first in one direction and then in the other direction the gyroscopic inertia of the wheel resisting the torque of said motor and maintaining the second yoke in a plane substantially parallel to its original position in space.

2. In an instrument of the character described, a frame substantially balanced upon a relatively rigid east-west horizontal pivotal mounting, a gyroscopic unit including a wheel and a yoke in which it is journaled, pivot means supporting said yoke in the frame with the spin axis of its wheel substantially parallel to the axis of the earth's rotation and with the axis of said pivot means substantially perpendicular to said axis of the earth, a continuously energized reversible motor on the frame, positive drive connections operative to continuously transmit torque from said motor to the frame about the relatively rigid horizontal pivotal mounting of said frame, to cause a definite loading of said frame, control means for said motor including a snap action switch whose operation instantly reverses the torque applied by said motor and also the direction of said loading, and means to operate said switch actuated by the precession of the gyroscope and yoke beyond a predetermined limit relative to said frame in either direction, said loading causing the gyroscope and yoke to precess continuously first in one direction and then in the other direction, the gyroscopic inertia of the wheel resisting the torque of said motor and maintaining the frame in a plane parallel to its original position in space.

3. In an instrument of the character described, a frame having an axis normally disposed in a north-and-south vertical plane, means movably supporting said frame with capacity for deviation of its said axis from said direction, a gyroscopic unit including a wheel and a yoke in which it is journaled, horizontal pivot means supporting said yoke in the frame with the spin axis of its wheel substantially parallel to the earth's axis of rotation, a second gyroscopic unit including a wheel and a yoke in which it is journaled with the spin axis of the wheel substantially parallel to the earth's axis of rotation, pivot means by which said last mentioned yoke is connected to the frame at an axis at right angles to the said north-and-south axis thereof, a continuously energized reversible motor connected to transmit torque to said yoke of the second gyroscope about the axis of its supporting pivot means creating a tendency for the second gyroscope to precess, thereby causing a definite torque on said frame about an axis perpendicular to the axis of rotation, control means for said motor including a snap action switch whose operation instantly reverses the torque applied by said motor and also the direction of said loading, and means to operate said switch actuated by the precession of the first mentioned gyroscope and yoke beyond a predetermined limit relative to said frame in either direction, such loading causing the first mentioned gyroscope and yoke to precess continuously first in one direction and then in the other direction, the gyroscopic inertia of the wheel resisting the loading of the frame and maintaining the frame in a position parallel to its original position in space.

4. In an instrument of the character described, a frame having a longitudinal axis normally disposed in a north-and-south vertical plane and substantially parallel to the earth's axis of rotation, means automatically maintaining the frame in such position, a gyroscopic unit including a wheel, a yoke in which it is journaled and a second yoke in which the first yoke is pivoted at an axis extending substantially at right angles to the spin axis of the wheel, pivotal means supporting the second yoke on said frame at an axis substantially at right angles to the first-mentioned pivot axis and parallel to the earth's axis of rotation, a motor carried on said frame with means for transmitting torque from said motor to the second yoke first in one direction and then in the opposite direction about the axis of the last-mentioned pivotal means including means continuously energizing said motor and also including a reversing switch with control means for said switch actuated by the precession of the gyro rotor and yoke in either direction the torque of the motor being opposed by the gyroscopic inertia of the gyroscopic unit, and the second yoke being held substantially parallel to its original position in space, and means adapting said instrument to indicate longitude including a pair of co-axially mounted members, means connecting one of them for rotation by the rotation of said second yoke about its supporting pivot axis, and a chronometer mechanism mounted on the frame and connected to rotate the other member once during each rotation of the earth about its axis, and indicating means controlled by said co-axial members.

5. In an instrument of the character described, a frame substantially balanced upon a relatively rigid east-west horizontal pivotal mounting, a gyroscopic unit including a wheel and a yoke in which it is journaled, pivot means supporting said yoke in the frame with the spin axis of its wheel substantially parallel to the axis of the earth's rotation and with the axis of said pivot means substantially perpendicular to said axis of the earth, a continuously energized reversible motor on the frame, positive drive connections operative to continuously transmit torque from said motor to the frame about the relatively rigid horizontal pivotal mounting of said frame, and control means operable by the precession of the gyroscopic wheel and its yoke and effective to reverse the torque of the motor, thus tending to rock the frame continuously up and down, but this tendency being resisted by the gyroscopic inertia of the wheel, which precesses continuously first in one direction and then in the opposite direction about the axis of its aforesaid yoke, whereby said axis and the frame are held substantially parallel to their original positions in space, together with means for overcoming friction and the inertia of parts at the time of reversal of the motor, comprising cooperating elements on the yoke and the frame, respectively, at least one of which is yielding in character, said elements being positioned for mutual engagement as the gyroscope approaches either limit of precession and serving to yieldingly arrest the precession and to store and release the energy of inertia of the precessing parts to reverse their movement coincidentally with the reversal of the torque of the motor.

6. In an instrument of the character described, a frame substantially balanced upon a relatively rigid east-west horizontal pivotal mounting, a gyroscopic unit including a wheel and a yoke in which it is journaled, pivot means supporting said yoke in the frame with the spin axis of its wheel substantially parallel to the axis of the earth's rotation and with the axis of said pivot means substantially perpendicular to said axis of the earth, a continuously energized reversible motor on the frame, positive drive connections operative to continuously transmit torque from said motor to the frame about the relatively rigid horizontal pivotal mounting of said frame, and control means operable by the precession of the gyroscopic wheel and its yoke and effective to reverse the torque of the motor, thus tending to rock the frame continuously up and down, but this tendency being resisted by the gyroscopic inertia of the wheel, which precesses continuously first in one direction and then in the opposite direction about the axis of its aforesaid yoke, whereby said axis and the frame are held substantially parallel to their original positions in space, said control means including relay circuits for operating the reversing switch, together with a contact member carried by the yoke and a pair of contacts supported by the frame in position to alternately engage said contact member as the gyroscope approaches its limits of precession, at least one of said contact elements being yielding in character and thus serving to yieldingly arrest the precession and to store and release the energy of inertia of the precessing parts to reverse their movement coincidentally with the reversal of the torque of the motor.

7. In an instrument of the character described, a gyroscopic apparatus which includes two gyroscopic wheels and yokes in which they are respectively journaled, a common outer yoke by which both yokes are carried on pivotal supports at parallel axes, the spin axis of each wheel being substantially perpendicular to the axis of pivotal support of its yoke, a frame and pivotal bearings thereon by which said outer yoke is carried on an axis substantially parallel to the earth's axis of rotation and normal to the axes of the inner yokes, a motor carried on said frame and connected to apply torque to said outer yoke about the axis of said pivotal bearings on which the yoke is carried, means mechanically connecting the first-mentioned yokes together adapted to maintain the spin axes of the wheels in perpendicular relation to each other, individual driving motors for the wheels, circuit-controlling means for each of said motors actuated by the pivotal movement of the wheel-carrying yoke in the outer yoke and each operative to reverse its motor when the wheel which it drives precesses to a position in which its spin axis approaches alignment with the axis of the pivotal bearings for the outer yoke.

8. In the construction defined in claim 7, an auxiliary motor supported on the outer yoke and connected to apply torque to one of the first-mentioned yokes about the axis of its pivotal support on the outer yoke and serving to augment the precession of the gyroscopic units.

9. In the combination defined in claim 1, a chronometer mechanism having a shaft which turns once for each rotation of the earth about its axis and in the same direction, together with a differential gear, one side of the gear being secured to the chronometer shaft to be rotated thereby and another side of the gear being secured to the said second yoke at its said axis of pivotal support, a rotatable index member and means operatively connecting it with the differential gear set adapted to turn said index member at a rate determined by the difference in the rates of rotation of the two first-mentioned gears of the set.

10. In the combination defined in claim 7, means adapting said instrument to indicate longitude comprising a coacting scale and indicator, means connecting the scale for rotation by the rotation of said outer yoke about its supporting pivot axis, and a chronometer mechanism mounted on the said supporting means and connected to rotate the indicator once during each rotation of the earth about its axis.

11. In an instrument of the character described, a stabilized support comprising a base, a frame, and means connecting the frame to the base including a vertical pivot and a gimbal mounting to allow a limited universal movement of said base with respect to the frame, including movement of said base in azimuth, a pair of gyroscopic units, each comprising a gyro rotor carried on a yoke with the spin axis of the rotor disposed vertically, and pivotal means supporting said yokes on horizontal axes in the frame, with one pivot axis substantially at right angles to the other, each gyroscopic unit being pendulously mounted on said frame and being free to precess independently of the other unit and without swinging the frame, whereby the pivot axis of each yoke tends to remain horizontal and said units cooperate to stabilize the frame horizontally.

12. In an instrument of the character described, a stabilized support comprising a base adapted to be mounted on a ship or other craft, a frame, and means connecting the frame to the base including a vertical pivot and a gimbal mounting to allow a limited universal movement of said base with respect to the frame, including movement of said base in azimuth, a pair of gyroscopic units, each comprising a gyro rotor carried on a yoke with the spin axis of the rotor disposed vertically, pivotal means supporting said yokes on horizontal axes in the frame, with one pivot axis substantially at right angles to the other, each gyroscopic unit being pendulously mounted on said frame and being free to precess independently of the other unit and without swinging the frame, whereby the pivot axis of each yoke tends to remain horizontal and said units cooperate to stabilize the frame, horizontally; and means to maintain the frame substantially in an original north-and-south position after initial adjustment thereto, said means comprising a gyroscopic apparatus, a second frame on which said apparatus is supported, said second frame being supported pivotally on the first mentioned frame on a horizontal axis, whereby the two frames pivot together about the axis of the vertical pivot and in relation to the craft on which the instrument is mounted, when the course of the craft is changed.

CHARLES E. EVANS.